United States Patent [19]

Schlaginhaufen

[11] Patent Number: 5,024,763
[45] Date of Patent: Jun. 18, 1991

[54] FILTERING APPARATUS
[75] Inventor: Arthur Schlaginhaufen, Rothrist, Switzerland
[73] Assignee: Arthur Schlaginhaufen Ing., Switzerland
[21] Appl. No.: 462,063
[22] Filed: Jan. 8, 1990
[30] Foreign Application Priority Data
    Jan. 9, 1989 [DE] Fed. Rep. of Germany ....... 3900390
[51] Int. Cl.[5] ............................................. B01D 29/64
[52] U.S. Cl. ............................... 210/333.01; 210/340; 210/390; 210/393; 210/397; 210/430
[58] Field of Search ..................... 210/333.01, 340, 393, 210/396, 397, 408, 411, 413, 429, 430, 431, 390; 137/239, 549

[56] References Cited
U.S. PATENT DOCUMENTS

| 781,039 | 1/1905 | Weabe | 210/430 |
| 2,598,322 | 5/1952 | Vokes | 210/397 |
| 3,428,181 | 2/1969 | Levis | 210/333.01 |
| 4,090,962 | 5/1978 | Braukman et al. | 210/333.01 |
| 4,308,142 | 12/1981 | Braukmann et al. | 210/411 |

FOREIGN PATENT DOCUMENTS 603213 8/1978 Switzerland.

Primary Examiner—W. Gary Jones
Assistant Examiner—Matthew O. Savage
Attorney, Agent, or Firm—Tarolli, Sundheim & Covell

[57] ABSTRACT

The filtering apparatus of the invention comprises a filter housing having a water inlet and a water outlet as well as a filter bell dome connected to the housing. A main filter member and thereabove a reversing flow filter member are coaxially arranged on a filter support member located in the interior of the filter bell dome. The filter support member is spirally movable within the filter bell dome. Further, reversing flow filter member cleaning brushes and main filter member cleaning brushes are fixedly mounted in said filter bell dome. In the operating position, the passage through the reversing flow filter is obstructed such that the water to be filtered flows through the main filter member from the exterior to the interior thereof. In the backwashing position, the filter support member is spirally displaced and simultaneously obstructs the direct access to the exterior of the main filter member. During the spiral motion of the filter support member, the main filter member and the reversing flow filter member are cleaned by said cleaning brushes. Thus, the main filter member and the reversing flow filter member are thoroughly cleaned in the same operation step while the supply of filtered waters is maintained during the cleaning and backwashing operation.

12 Claims, 2 Drawing Sheets

FILTERING APPARATUS

BACKGROUND OF THE INVENTION

1. Field of the Invention

The present invention refers to a filtering apparatus for house water main installations, comprising a housing having a water inlet and a water outlet, a filter bell dome removably connected to said housing, a cylindrically shaped main filter member mounted in the interior of said filter bell dome, a cylindrically shaped reversing flow filter member superposed to said main filter member and mounted in the interior of said filter bell dome, and a tubular member located in the interior of said reversing flow filter member.

In this filtering apparatus, the main filter member topped to the reversing flow filter member is flowed through from its exterior to its interior in its operative condition when the flow path through the reversing flow filter member is closed, while for backwashing the access to the outer surface of the reversing flow filter member is open and the access to the outer surface of the main filter is closed and the interior of the main filter member is connected to the outlet in said housing of the filtering apparatus by means of the tubular member located in the interior of the reversing flow filter member such that the water to be filtered flows through the reversing flow filter and then partially through the outlet of the filtering apparatus to a consumer's installation and partially through the main filter member from its interior to its exterior.

2. Prior Art

Such a filtering apparatus which can be cleaned by reversing the flow of water through the filter member is known from e.g. Swiss Patent Nr. 603,213. The filtering apparatus disclosed in said Swiss Patent comprises as obstruction mechanism in the reversing flow filter member. The obstruction mechanism being in its open condition, the water flows through the reversing flow filter and contaminated water flows out of the filtering apparatus via a valve which is opened during the reversing flow operation. Thereby, the problem of a continuous water supply from the filtering apparatus even during the cleaning operation was solved: For cleaning the filter member in counterflow only a part of the water supplied to the filtering apparatus is used, while the remaining part of the water bypasses the main filter member and flows directly to the outlet of the filtering apparatus. Thus, filtered water is also obtained during counterflow cleaning of the filtering apparatus.

The main disadvantage of this filtering apparatus is that the contaminated main filter member is only hydraulically cleaned in counterflow while the reversing flow filter member is not cleaned at all. However, it often happens that during backwashing, depending on the water pressure, the deposits on the main filter member initially are removed only at a certain place on the outer surface of the main filter member with the consequence that the entire cleaning water flows through the opening created in this way. Thus, the main filter member is not properly cleaned and a layer of deposits and contaminations remains on the main filter member after switching to normal operation of the filtering apparatus. Such a layer of deposits and contaminations impairs the proper operation of the filtering apparatus.

Tests run by the Inventor have shown that a thorough removal of deposits and contaminations from the surface of the main filter member is not possible solely by hydraulic backwashing. The layer consisting of deposits and contaminations has irregular thickness and only the weakest parts of this layer are removed during backwashing while the remaining major layer of deposits and contaminations is kept on the main filter surface.

OBJECTS OF THE INVENTION

It is an object of the present invention to improve a filtering apparatus of the kind referred to hereinabove such that a thorough cleaning of the filtering apparatus is effected.

It is a further object of the present invention to improve a filtering apparatus of the kind referred to hereinabove such that not only the main filter member but also the reversing flow filter member is thouroughly cleaned in one and the same operational step.

It is a still further object of the present invention to improve a filtering apparatus of the kind referred to hereinabove such that the main filter member and the reversing flow filter member are thouroughly cleaned while, simultaneously, filtered fresh water can be supplied by the filtering apparatus.

SUMMARY OF THE INVENTION

In order to meet these and other objects, the invention provides a filtering apparatus for house water main installations comprising a housing having a water inlet and a water outlet and a filter bell dome removably connected to the housing. A cylindrically shaped main filter member and a cylindrically shaped reversing flow filter member superposed to said main filter member are mounted in the interior of the filter bell dome. A tubular member is located in the interior of the reversing flow filter member.

The main filter member topped to the reversing flow filter member is flowed through from its exterior to its interior in its operative condition when the flow path through said reversing flow filter member is closed. For backwashing the access to the outer surface of the reversing flow filter member is open and the access to the outer surface of the main filter is closed and the interior of the main filter member is connected to the outlet in the housing of the filtering apparatus by means of said tubular member located in the interior of the reversing flow filter member. Thereby, the water to be filtered flows through the reversing flow filter and then partially through the outlet of the filtering apparatus to a consumer's installation and partially through the main filter member from its interior to its exterior.

The filtering apparatus further comprises a common support member for the main filter member and the reversing flow filter member. The common support member constitutes the movable portion of a sealing member and is rotatable and axially adjustable between an opened position and a closed position. The main filter member and the reversing flow filter member being mounted on said common support member.

Further, there are provided a first plurality of brush means fixedly mounted in the interior of the filter bell dome and located adjacent to said main filter member, and a second plurality of brush means fixedly mounted in the interior of the filter bell dome and located adjacent to the reversing flow filter member. The first plurality of brush means engages the porous outer surfaces of the main filter member and the second plurality of brush means engages the porous outer surface of the reversing flow filter member.

The main filter member and the reversing flow filter member mounted on the common support member perform a spiral rotation movement when the common support member is adjusted from its closed position to its opened position and vice versa whereby the outer surfaces of the main filter member and the reversing flow filter member, respectively, are mechanically cleaned by said first and second pluralities of brush means, respectively.

BRIEF DESCRIPTION OF THE DRAWINGS

In the following, a preferred embodiment of the filtering apparatus according to the invention will be further described, with reference to the accompanying drawings, in which.

DETAILED DESCRIPTION OF A PREFERRED EMBODIMENT

Figure 1:
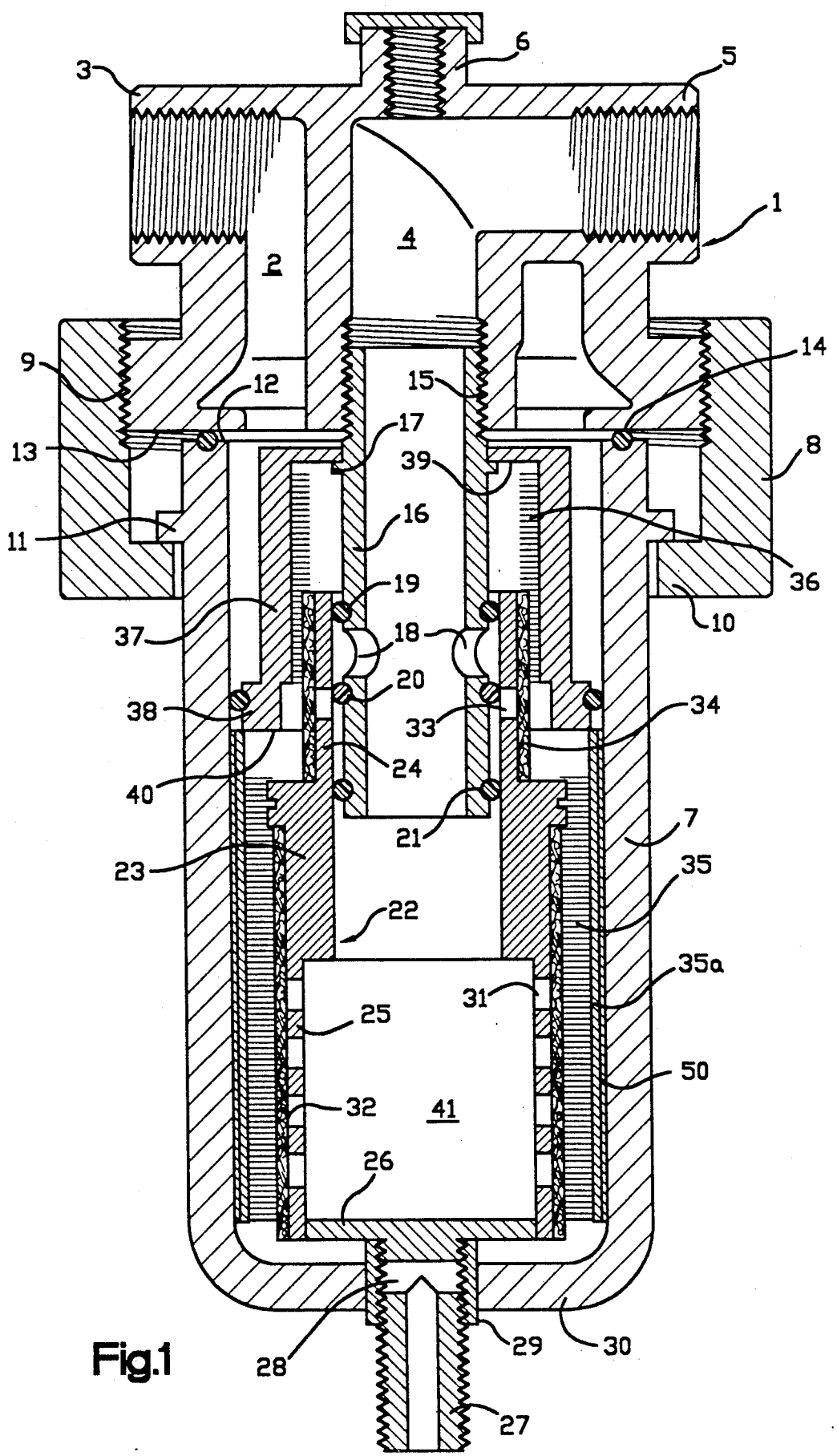
FIG. 1 shows a vertical sectional view of the filtering apparatus in its normal operating condition.

The embodiment of the filtering apparatus shown in FIG. 1 comprises a filter housing 1 having an annular water inlet chamber 2 communicating with a water inlet 3 as well as a central water outlet chamber 4 communicating with a water outlet 5. The water inlet 3 and the water outlet 5 are coaxially arranged whereby, in the usual installation of the filtering apparatus, the central axis through the water inlet 3 and the water outlet 5 runs horizontally. Furthermore, the filter housing 1 comprises an additional connection piece 6 communicating with the water outlet chamber 4 and serving, for example, to connect a pressure gauge.

A filter bell dome is designated with reference numeral 7 and is manufactured preferably of transparent plastic material. The filter bell dome 7 is mounted on the filter housing by means of a union nut 8 such that it can be easily removed for servicing the filter apparatus. To fix the filter bell dome 7, the union nut 8 is screwed onto the outer thread 9 provided at the lower portion of the filter housing 1. The filter bell dome 7 is provided with an annular rib 11 protruding from its outer surface and the union nut 8 is provided with an inwardly protruding shoulder 10. In connecting the filter bell dome 7 to the filter housing 1 by means of the union nut 8, a portion of the inner surface of the shoulder 10 engages the lower surface of the annular rib 11 of the filter bell dome 7 and thereby presses it with its annular end face 12 against a flat surface 13 provided at the bottom surface of the filter housing 1. As can be seen from FIG. 1, a sealing ring 14 is inserted between the annular end face 12 of the filter bell dome and the flat bottom surface 13 of the filter housing 1 to seal the interior of the filter bell dome 7.

The inlet chamber 2 annularly merges into the filter bell dome 7 and concentrically surrounds the orifice of the water outlet chamber 4. A lower portion of the water outlet chamber 4 provided with an inner thread 15. The filter apparatus is further provided with a tubular guiding member 16 extending vertically and concentrically to the filter bell dome 7 in the interior thereof. An upper portion of the tubular guiding member 16 is provided with an outer thread which is screwed into the inner thread 15 of the water outlet chamber 4. Below the outer thread, the tubular guiding member 16 comprises an annular rib 17 and, still further downwards, a plurality of radial apertures 18 which are distributed over the circumference of the tubular guiding member 16 in equal axial heights. An O-ring 19 is mounted on the tubular guiding member 16 above said apertures 18 and an O-ring 20 is mounted on the tubular guiding member 16 below said apertures 18. A further O-ring 21 is mounted on the tubular guiding member 16 adjacent to its lower end. These O-rings 19, 20 and 21 serve for sealing purposes as will be explained hereinbelow.

The filter apparatus of the invention further comprises a filter support member 22 which is mounted in the interior of the filter bell dome in coaxial relationship to the tubular guiding member 16. The filter support member comprises an annular central portion 23 provided with a coaxially running upper sleeve portion 24 and a coaxially running lower sleeve portion 25. The lower end of the lower sleeve portion 25 of the filter support member 22 is sealed by means of a bottom member 26. The bottom member 26 is provided with a centrally mounted tubular spindle member 27 which projects downwards from the outer surface of the bottom member 26 and comprises a fluid passage 28. The bottom portion 30 of the filter bell dome 7 is provided with a tubular connection piece 29 having an inner thread. The tubular spindle member 27 has an outer thread and is screwed into the inner thread of said tubular connection piece 29. Thus, when the tubular spindle member 27 is rotated, simultaneously an axial displacement thereof takes place. It is evident that simultaneously the filter support member 22 is rotated and axially displaced since the tubular spindle member 27 forms an integral part of the filter support member 22. Consequently, upon rotation of the tubular spindle member 27 the filter support member 22 with its upper and lower sleeve portions 24 and 25, respectively, is driven to a spiral motion.

The lower sleeve portion 25 is provided with a plurality of apertures 31 which are evenly distributed over its outer surface. The said lower sleeve portion 25 serves to receive a main filter 32 of corresponding shape and dimensions. Preferably, the main filter member may comprise a fine wire mesh and covers the entire surface of the lower sleeve portion 25.

Figure 2:
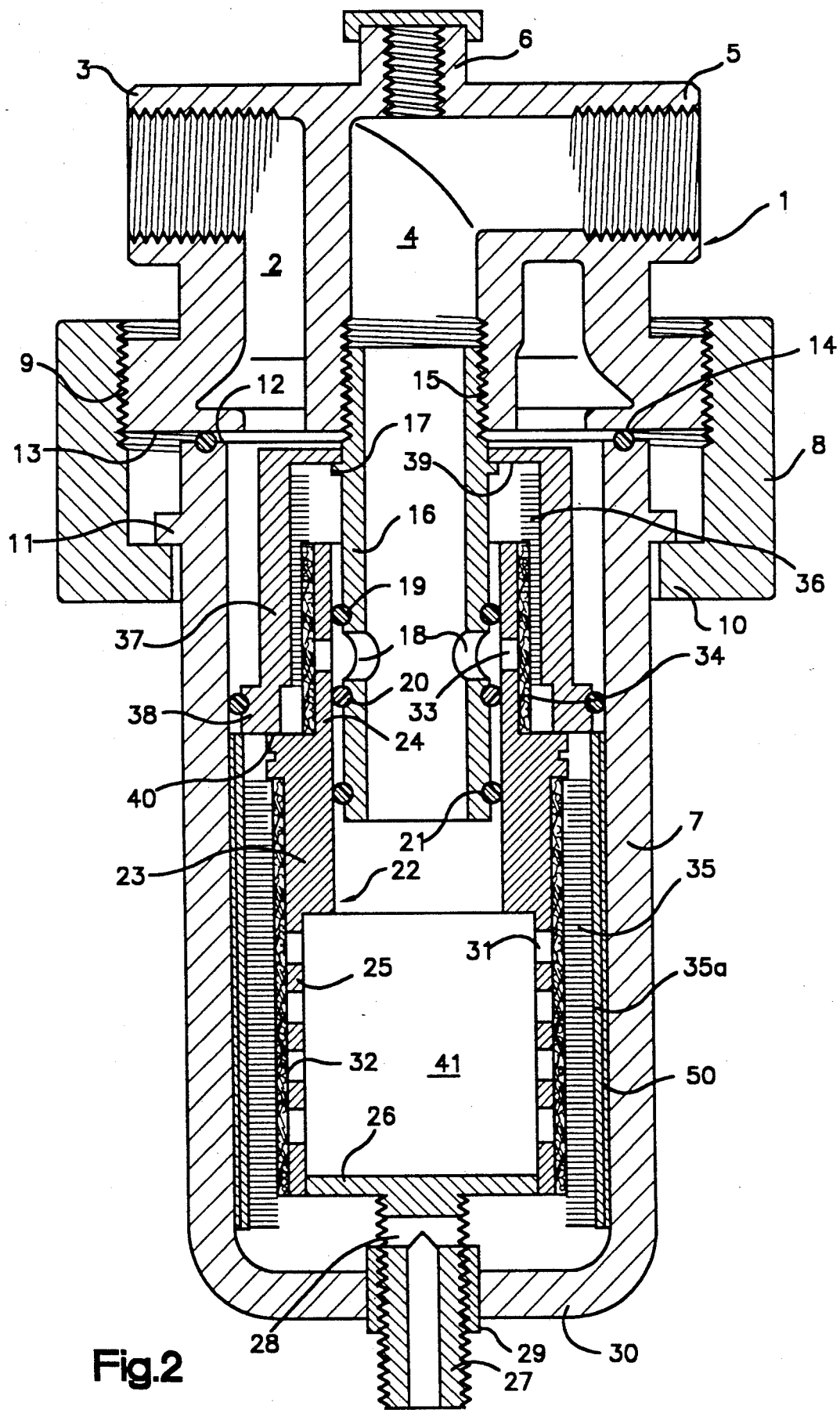
FIG. 2 shows a vertical sectional view of the filtering apparatus during backwashing.

The upper sleeve portion 24 extending upwardly from the central portion 23 of the filter support member 22 comprises a number of apertures 33 which are distributed over the circumference of the sleeve portion 24 at equal height. If the filter support member 22 is in its lowermost position as shown in FIG. 1, the apertures 33 of the sleeve portion 24 are located at a lower height level than the apertures 18 provided in the tubular guiding member 16. After rotation and axial displacement in upwards direction of the filter support member 22, i.e. if the filter support member 22 is in its uppermost position as shown in FIG. 2, the apertures 33 coincide with the apertures 18 provided in the tubular guiding member 16.

As can be further seen from the drawings, the filter apparatus of the invention is provided with a reversing flow filter member 34. It may consist of a fine wire mesh as well and its shape and dimensions are such that it fits over the upper sleeve portion 24 of the tubular filter support member 22.

The filter apparatus of the invention further comprises cleaning brushes adapted to clean the outer surfaces of the main filter member 32 and of the reversing flow filter member 34, respectively. The main filter cleaning brushes 35 include a number of single, elongate and narrow brush bodies 35a extending in axial direction of the filter bell dome 7. They are mounted on the interior wall of the filter bell dome 7 adjacent to the surface of the main filter member 32 and distributed along the circumference of the filter bell dome 7. Each brush body 35a of the main filter cleaning brushes 35 is releasably mounted in a strip-like brush support member 50 in such a manner that the bristles of the brushes 35 radially project towards the surface of the main filter member 32 and penetrate the pores thereof. Thus, upon rotation and axial displacement of the main filter member 32, the bristles of the main filter brushes 35 clean the outer surface of the main filter member 32. In order that the brushes 35 may be periodically cleaned or replaced, the brush bodies 35a may be axially drawn off the brush support members 50.

For cleaning the reversing flow filter member 34, cleaning brushes 36 are provided which are mounted on support arms 37 of a brush support member. The brush support member comprises a support ring 38 and a plurality (e.g. four) of support arms 37 connected to the support ring 38 and being evenly distributed over the circumference thereof. The upper free ends of the support arms 37 are fixed to an annular support plate 39. The annular support plate 39 includes a central circular aperture through which the tubular guiding member 16 extends. Thereby, the design is such that the peripheral edge of the support plate 39 engages an annular rib 17 of the tubular guiding member 16 in order to fix the annular support plate 39 in the housing 1 of the filter apparatus.

Preferably, four support arms 37 are provided and each support arm 37 is equipped with a reversing flow filter cleaning brush 36.

The fixed support ring 38 of the brush support member for the cleaning brushes 36 which are intended to clean the outer surface of the reversing flow filter member 34 as well as the movable annular central portion 23 of the filter support member 22 together constitute a sealing means. Upon the combined rotation and axial displacement of the annular central portion 23, the latter one finally will abut against a sealing surface 40 of the annular support member 38 and thereby forms a sealing which obstructs the direct flow of water from the inlet chamber 2 to the main filter member 32 and further through the apertures 31 into the chamber 41. Instead of the sealing surface 40 provided on the support ring 38, a sealing ring (not shown) could be provided which sealingly cooperates with the support ring 38 upon axial displacement of the annular central portion 23 into its upper end position.

The operation of the filter apparatus as hereinbefore described is as follows:

The housing 1 of the filter apparatus is inserted into the water main conduit, i.e. into the water pipe through which water is supplied to the house. The water main conduit is cut and a piece corresponding to the size of the housing in lateral direction is removed. The water inlet 3 of the filter apparatus is connected to the pipe supplying the water to the house, and the water outlet 5 is connected to the pipe leading the water into the house.

The supplied water flows through the water inlet 3 into the inlet chamber 2 and further vertically downwards into the filter bell dome 7. Thereby, the tubular guiding member 16 as well as the support arms 37 are flown around.

In the normal operating position as shown in FIG. 1, the apertures 33 and 18 do not coincide; thus, no water can penetrate the tubular guiding member 16. Additionally, the O-rings 20 and 21 act as sealing members insofar as they prevent any water from flowing further once it has passed the apertures 33. In contrary, the water flows downwards into the chamber surrounding the main filter member 32, then through the pores of the main filter member 32 from the outside to the interior of the main filter member 32, whereby it is filtered, further through the apertures 31 provided in the sleeve portion 25 of the filter support member 22 into the interior of the chamber 41 of the sleeve portion 25.

The water filtered by the main filter member 32 further flows vertically upwards through the tubular guiding member 16 into the outlet chamber 4, is deflected therein and leaves the filter housing 1 through the water outlet 5 to be led to the consumer. Since the apertures 33 of the sleeve portion 24 do not coincide with the apertures 18 of the tubular guiding member 16, but are closed by the effect of the sealing rings 20 and 21 provided above and below the apertures 33 as long as the filter apparatus is in its operative position as shown in FIG. 1, no water can flow through the reversing flow filter member 34 and through the apertures 33 and 18 into the interior of the tubular guiding member 16.

As soon as it is required to clean the main filter member 32, the tubular spindle member 27 is rotated by means of a suitable tool or an operating wheel (not shown) with the consequence that the tubular spindle member 27 is not only rotated but also performs an axial displacement vertically upwards into a cleaning position as shown in FIG. 2. Upon rotation and axial displacement of the tubular spindle member 27, also the filter support member 22 is rotated and axially displaced. Thus, the main filter member 32 and the reversing flow filter member 34 are mechanically cleaned and any contaminations and deposits present on their outer surface is removed under the influence of the cleaning brushes 35 and 36, respectively. Furthermore, once the final upper position is reached, the apertures 33 in the sleeve portion 24 coincide with the apertures 18 of the tubular guiding member 16 while the sealing means constituted by the annular central portion 23 of the filter support member 22 and the support ring 38 is closed. Simultaneously, the fluid passage 28 of the tubular spindle member 27 is opened.

In this position, as shown in FIG. 2, the water flows from the inlet chamber 2 into the upper portion of the filter bell dome 7, but is prevented from flowing further downwards since the support ring 38 in cooperation with the annular central portion 23 of the filter support member 22 obstruct the passage leading further downwards. However, the passage through the apertures 33 and 18 is now open with the consequence that the water flows into the interior of the tubular guiding member 16. Therefrom, the water partially flows upwards into the outlet chamber 4 and partially downwards into the interior of the chamber 41 of the filter support member 22. From the chamber 41, the water flows through the apertures 31 from the interior to the exterior whereby the main filter member 32 is further cleaned and the remaining contaminations and deposits are removed from its outer surface. The contaminated water flows down in the annular chamber between the main filter member 32 and the filter bell dome 7 and gets out of the filter apparatus through the fluid passage 28 and the central bore in the tubular spindle member 27. Preferably, a recipient is put under the tubular spindle member 27 to collect the contaminated water.

As shown and explained hereinabove, upon rotating the spindle member 27, both filter members, i.e. the main filter member 32 and the reversing flow filter member 34 are thouroghly mechanically cleaned by means of the related brushes 35 and 36, respectively. In the cleaning position as shown in FIG. 2, additionally a hydraulic cleaning is performed since the main filter member 32 is flown through in the reverse direction compared to the operating position as shown in FIG. 1. Furthermore, it is ensured that the water supply is maintained during the cleaning operation of the filter apparatus.

The filter apparatus as described hereinabove is particularly suitable for home water installations and provides an optimal filtering effect of the water supplied to the house which is not impaired by a gradually occuring plugging or blockage of the filter members. In contrary, the main filter member and the reversing flow filter member are mechanically cleaned by the effect of the related brushes, and the main filter member is additionally hydraulically cleaned by the counterflowing water. The water supply to the house is always maintained, also during the cleaning operation of the filter apparatus.

Finally, it should be noted that the filter apparatus as hereinbefore described is of very simple design and consists of easily replaceable components. Many or even most of the components of the filter apparatus may be manufactured of plastic material in order to satisfy the highest hygienic demands. The components which are subjected to wear, e.g. the brush members, can easily be replaced; the suitable replacement operation is straightforward and can be done even by an unprofessional person quickly and easily. The production of the filter apparatus of the invention is simple and cheap and the filtering effect is maintained during a very long period of time.

What I claim is:

1. A filtering apparatus for a house water main installation, comprising:
   a housing having a water inlet and a water outlet;
   a filter bell dome removably connected to said housing;
   a cylindrically shaped main filter member having a water flow path therethrough and mounted in the interior of said filter bell dome;
   a cylindrically shaped reversing flow filter member having a water flow path therethrough and superposed to said main filter member and mounted in the interior of said filter bell dome;
   a tubular guiding member located in the interior of said reversing flow filter member and connecting the interior of said main filter member and said outlet of said housing;
   a filter support member for mounting said main filter member and said reversing flow filter member, said filter support member being rotatable and axially adjustable between a backwashing position in which the flow path through the reversing flow filter member is open and a normal position in which the flow path through the reversing flow filter member is closed, said filter support member including first sealing means;
   support means for directing water flow to said main filter member to flow from its exterior to its interior when the flow path through said reversing flow filter member is closed;
   said support means including second sealing means cooperating with said first sealing means of said filter support member to block the flow path through said main filter member from its exterior to its interior when the flow path through said reversing flow filter member is open, the flow of water to the outer surface of said reversing flow filter member flowing through said reversing flow filter and then partially through said outlet and partially through said main filter member from its interior to its exterior when the flow path through said reversing flow filter member is open;
   a first brush means for cleaning said main filter member, said first brush means fixedly mounted in the interior of said filter bell dome and located adjacent to said main filter member;
   a second brush means for cleaning said reversing flow filter member, said second brush means fixedly mounted in the interior of said filter bell dome and located adjacent to said reversing flow filter member;
   said first brush means engaging outer surfaces of said main filter member and said second brush means engaging outer surfaces of said reversing flow filter member;
   means for adjusting said main filter member and for causing said main filter member and said reversing flow filter member mounted on said filter support member to perform a spiral rotational movement when said filter support member is adjusted from its normal position to its backwashing position and vice versa whereby the outer surfaces of said main filter member and said reversing flow filter member, respectively, are mechanically cleaned by said first and second brush means, respectively.

2. A filtering apparatus according to claim 1 in which said filter support member for said main filter member and said reversing flow filter member comprises a central annular portion, an upper sleeve portion, and a lower sleeve portion having a bottom, and in which a tubular spindle member is connected to said bottom of said lower sleeve portion, said filter support member being rotatably and axially slidably received in the bottom of said filter bell dome by means of said tubular spindle member.

3. A filtering apparatus according to claim 2 in which said lower sleeve portion receiving said main filter member is provided with a plurality of apertures evenly distributed over the surface of said lower sleeve portion.

4. A filtering apparatus according to claim 2 in which said filter bell dome includes a tubular connecting piece located at the bottom of said filter bell dome, said tubular spindle member comprises a transverse fluid passage which is closed by said tubular connecting piece when said filter support member is in its normal position and is open when said filter support member is in its backwashing position, said transverse fluid passage extending between portions of said tubular connecting piece when said transverse fluid passage is closed by said tubular connecting piece.

5. A filtering apparatus according to claim 1 in which said tubular guiding member centrally projects into the interior of said filter bell dome and communicates with said outlet, one end portion of said tubular guiding member having an outer threaded portion and being screwed into a threaded portion of said housing.

6. A filtering apparatus according to claim 1 or 2 in which said tubular guiding member is provided with a plurality of apertures distributed over the circumference of said tubular guiding member and wherein said upper sleeve portion is provided with a plurality of aperture distributed over the circumference of said upper sleeve portion, whereby said plurality of apertures provided in said tubular guiding member coincide with said plurality of apertures provided in said upper sleeve portion when said filter support member is in its backwashing position.

7. A filtering apparatus according to claim 6 in which said tubular guiding member is provided with sealing rings located above and below said apertures which seal the annular gap between said tubular guiding member and said upper sleeve portion.

8. A filtering apparatus according to claim 1 in which said first brush means includes strip-like main filter cleaning brushes located at the lower portion of said filter bell dome, said strip-like main filter cleaning brushes being distributed along the circumference of the inner surface of said filter bell dome and cooperating with said main filter member.

9. A filtering apparatus according to claim 1 in which said second brush means includes strip-like reversing flow filter cleaning brushes located at the upper portion of said filter bell dome, said strip-like reversing flow filter cleaning brushes being distributed along the circumference of the inner surface of said filter bell dome and cooperating with said reversing flow filter member.

10. A filtering apparatus according to claim 9 in which said support means includes a plurality of vertically running support arms evenly distributed along the circumference of said reversing flow filter member for receiving said cleaning brushes for the cleaning of said reversing flow filter member, said support arms being fixed at their lower free ends to a support ring and at their upper free ends to an annular support plate.

11. A filtering apparatus according to claim 10 in which said annular support plate surrounds said tubular guiding member and is radially and axially fixedly held by an annular rib provided on said tubular guiding member.

12. A filtering apparatus according to claim 1 in which said main filter cleaning brushes and said reversing flow filter cleaning brushes are removably mounted in guiding members provided on the inner surface of said filter bell dome.

* * * * *